US012562087B2

(12) United States Patent
Eom et al.

(10) Patent No.: US 12,562,087 B2
(45) Date of Patent: Feb. 24, 2026

(54) DISPLAY DRIVER CIRCUIT AND DEFECT TESTING METHOD

(71) Applicant: SAMSUNG ELECTRONICS CO., LTD., Suwon-si (KR)

(72) Inventors: Jeeyeon Eom, Suwon-si (KR); In-Suk Kim, Suwon-si (KR); Yeonjeong Lee, Suwon-si (KR)

(73) Assignee: Samsung Electronics Co., Ltd.

( * ) Notice: Subject to any disclaimer, the term of this patent is extended or adjusted under 35 U.S.C. 154(b) by 0 days.

(21) Appl. No.: 18/742,820

(22) Filed: Jun. 13, 2024

(65) Prior Publication Data

US 2025/0124835 A1 Apr. 17, 2025

(30) Foreign Application Priority Data

Oct. 11, 2023 (KR) ........................ 10-2023-0135107

(51) Int. Cl.
*G09G 3/00* (2006.01)
*G09G 3/3283* (2016.01)
*G09G 3/3291* (2016.01)

(52) U.S. Cl.
CPC ........... *G09G 3/006* (2013.01); *G09G 3/3283* (2013.01); *G09G 3/3291* (2013.01)

(58) Field of Classification Search
CPC ..... G09G 3/006; G09G 3/3283; G09G 3/3291
See application file for complete search history.

(56) References Cited

U.S. PATENT DOCUMENTS 6,956,378 B2 10/2005 Morita
10,467,974 B2 11/2019 Satoh
2016/0027355 A1 1/2016 Tsuchi

FOREIGN PATENT DOCUMENTS

JP 3739690 1/2006
JP 3833043 10/2006
JP 4066328 3/2008
KR 10-0272663 12/2000
KR 20230143837 A * 10/2023 ............ G09G 3/006

* cited by examiner

*Primary Examiner* — Sardis F Azongha
(74) *Attorney, Agent, or Firm* — Fish & Richardson P.C.

(57) ABSTRACT

An example display driving integrated circuit includes a gamma voltage generator, a source driver, gamma lines, a first transistor, and a second transistor. The gamma voltage generator generates gamma voltages. The source driver generates data signals based on the gamma voltages. The gamma lines connect the gamma voltage generator with the source driver, and transmit the gamma voltages. The first transistor and the second transistor connect to a first end and a second end of a first gamma line of the gamma lines. The first transistor includes a first gate for receiving a first signal. The second transistor includes a second gate for receiving a second signal. The first signal and the second signal are complementary to each other.

20 Claims, 15 Drawing Sheets

DISPLAY DRIVER CIRCUIT AND DEFECT TESTING METHOD

CROSS-REFERENCE TO RELATED APPLICATION

This application claims priority to and the benefit of Korean Patent Application No. 10-2023-0135107 filed in the Korean Intellectual Property Office on Oct. 11, 2023, the entire contents of which are incorporated herein by reference.

BACKGROUND

An electronic device includes a display driver integrated circuit (DDI) for displaying image data on a display panel. The display driving integrated circuit includes a source driver for providing input data signals relating to the image data to pixels included in a display panel through source lines. The source driver includes source channels respectively connected to the source lines. One source channel includes a source decoder for selecting one of gamma voltages generated by a gamma voltage generator based on an input data signal and a source amplifier for amplifying or buffering the selected voltage and providing the same as a data voltage to pixels within a predetermined time.

In this instance, gamma lines between the gamma voltage generator and the source driver may have resistance increased or reduced by factors such as a bad process or a short-circuit with adjacent lines. When resistance of the gamma line is not good, the pixels may have a difficulty in receiving the accurate data voltage so electronic device may fail to output high-quality images.

SUMMARY

The present disclosure relates to a display driving integrated circuit for determining defects of a gamma line, and a defect testing method for quickly screening a display driving integrated circuit including abnormal gamma lines.

In some implementations, a display driving integrated circuit includes: a gamma voltage generator for generating gamma voltages; a source driver for generating data signals based on the gamma voltages; gamma lines for connecting the gamma voltage generator and the source driver and transmitting the gamma voltages; and a first transistor and a second transistor connected to respective ends of a first gamma line from among the gamma lines and including gates for receiving signals that are complementary to each other.

In some implementations, a display driving integrated circuit includes: a source driver for generating data signals based on gamma voltages; gamma lines for transmitting the gamma voltages to the source driver; first transistors arranged at a front end of the gamma lines; and second transistors having different types from the first transistors and arranged at a rear end of the gamma lines.

In some implementations, a method for testing defects of a gamma line sequentially connected to a first transistor, a source driver, and a second transistor includes: applying a first test voltage to the first transistor, and applying a second test voltage to the second transistor; transmitting an enable signal to a gate of the second transistor, and transmitting a not-enable signal that is an inverted signal of the enable signal to a gate of the first transistor; obtaining a current value of a current flowing to the gamma line; and determining whether the gamma line has a defect based on the current value.

DETAILED DESCRIPTION

Figure 1:
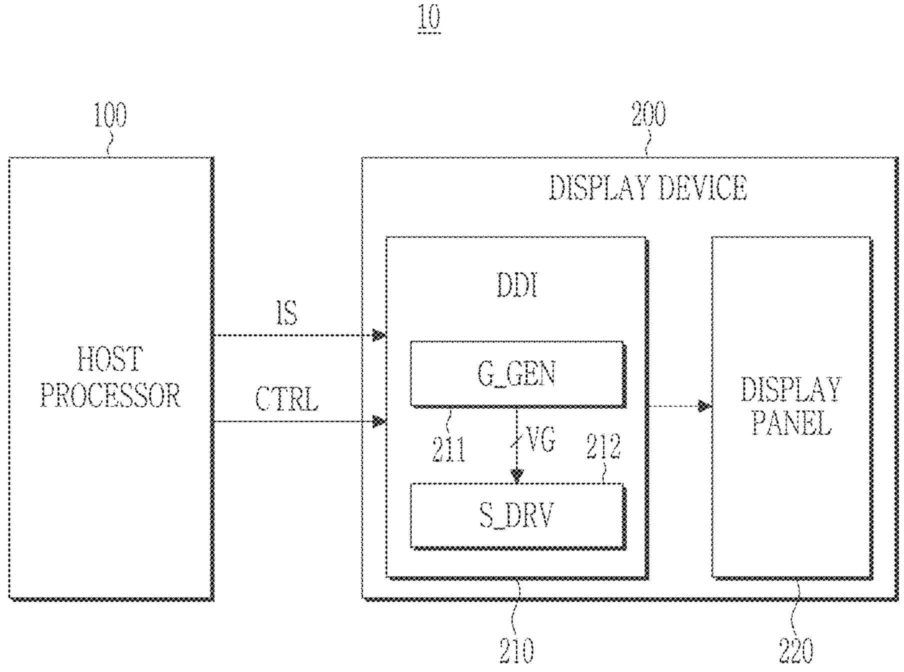
FIG. 1 shows a block diagram of an example of a display system.

In the following detailed description, only certain implementations of the present disclosure have been shown and described, by way of illustration. As those skilled in the art would realize, the described implementations may be modified in various different ways, all without departing from the spirit or scope of the present disclosure.

Accordingly, the drawings and description are to be regarded as illustrative in nature and not restrictive, and like reference numerals designate like elements throughout the specification. In the flowcharts described with reference to the drawings in this specification, the operation order may be changed, various operations may be merged, certain operations may be divided, and certain operations may not be performed.

An expression recited in the singular may be construed as singular or plural unless the expression "one", "single", etc., is used. Terms including ordinal numbers such as first, second, and the like, will be used only to describe various components, and are not to be interpreted as limiting these components. The terms may only be used to differentiate one component from others.

FIG. 1 shows a block diagram of an example of a display system.

Referring to FIG. 1, the display system 10 may be mounted on the electronic device with an image displaying function. For example, the electronic device may include a smartphone, a tablet personal computer (PC), a portable multimedia player (PMP), a camera, a wearable device, a television, a digital video disk (DVD) player, a refrigerator, an air conditioner, an air cleaner, a set-top box, a robot, a drone, various medical appliances, a navigation device, a global positioning system (GPS) receiver, a vehicle device, furniture, or various measurement devices.

In some implementations, the display system 10 may provide an artificial reality system, for example, a virtual reality (VR) system, an augmented reality (AR) system, a mixed reality (MR) system, a hybrid reality system, or combinations thereof, and/or derivative systems. The artificial reality system may be realized on various types of platforms including a head mounted display (HMD), a mobile device, a computing system, and other hardware platforms for providing artificial reality contents to at least one viewer.

The display system 10 may include a host processor 100 and a display device 200. The display device 200 may include a display driving integrated circuit (DDI) 210, and a display panel 220.

The host processor 100 may generate an input image signal (IS) to be displayed on the display panel 220, and may transmit the input image signal (IS) and a control instruction (CTRL) to the DDI 210. The input image signal (IS) may include frame data that correspond to respective frames. The control instruction (CTRL) may include setting information on luminance, gamma, and a frame frequency.

The host processor 100 may be a graphic processor. However, the present disclosure is not limited thereto, and the host processor 100 may be realized with various types of processors such as a central processing unit (CPU), a microprocessor, a multimedia processor, an application processor (AP), or an electronic control unit (ECU). In some implementations, the host processor 100 may be realized with an integrated circuit (IC) or a system on chip (SoC).

The display device 200 may receive the input image signal (IS) from the host processor 100, and may display an image based on the input image signal (IS). The display device 200 may display a two-dimensional (2D) or three-dimensional (3D) image to the user. In some implementations, the display device 200 may be a device in which the DDI 210 and the display panel 220 are implemented into a single module. For example, the DDI 210 may be mounted on the substrate of the display panel 220, or the DDI 210 and the display panel 220 may be electrically connected to each other through a connecting member such as a flexible printed circuit board (FPCB).

The DDI 210 may generate analog signals for driving the display panel 220 based on the input image signal (IS) received from the host processor 100. For example, the analog signals may include gate signals and data signals driving the pixels included in the display panel 220. The DDI 210 may provide the gate signals and the data signals to the pixels. The display panel 220 may discharge image light that corresponds to the input image signal (IS) by the signal provided by the DDI 210.

The DDI 210 may include a gamma voltage generator (G_GEN) 211 and a source driver (S_DRV) 212. The gamma voltage generator 211 may generate gamma voltages VG. The gamma voltages VG may correspond to various levels of luminance. The gamma voltage generator 211 may output the gamma voltages VG to the source driver 212.

The source driver 212 may generate data signals on the input image signal (IS) based on the gamma voltages VG. For example, the source driver 212 may include a decoder and a source amplifier. The source driver 212 may output the data signals to the display panel 220.

In some implementations, a resistance component of the wire for connecting the gamma voltage generator 211 and the source driver 212 may not be uniform. For example, gamma lines may be arranged between the gamma voltage generator 211 and the source driver 212, and the gamma voltage generator 211 may output the gamma voltages VG to the source driver 212 through the gamma lines. The gamma lines may generate non-uniform resistance component when defects are generated during a process or adjacent lines are short-circuited, which may deteriorate quality of the images output by the display device 200. For example, when the resistance component of at least one of the gamma lines deviates from a reference resistance range, the gamma voltage generator 211 may not output a target voltage within a target time. That is, the source driver 212 may receive an undesired voltage at an undesired time, and the display panel 220 may output a low-quality image.

The DDI 210 may accordingly measure the resistance component of at least one of the gamma lines for connecting the gamma voltage generator 211 and the source driver 212. The DDI 210 may determine the gamma line of which the measured resistance component deviates from a reference resistance range to be bad. The DDI 210 may determine the gamma line of which the measured resistance component is within a reference resistance range to be normal. In some implementations, not the DDI 210 but an external test device may be connected to the DDI 210 and may measure the resistance component of the gamma line. In some implementations, the DDI 210 may measure a current or a voltage of the source driver 212, and may determine whether the gamma line has a defect based on the measured value.

The display panel 220 may display images to the user based on data signals of the source driver 212. The display panel 220 may be one of the display devices for receiving image signals that are electrically transmitted and displaying images, such as a thin film transistor-liquid crystal display (TFT-LCD), a light emitting diode (LED) display, a micro light emitting diode (μLED) display, an organic light emitting diode (OLED) display, an active matrix OLED display (AMOLED), a transparent OLED display (TOLED), or a field emission display, a plasma display panel (PDP). In some implementations, the display panel 220 may be single or plural. For example, the two display panels 220 may output image light to eyes of the user.

Figure 2:
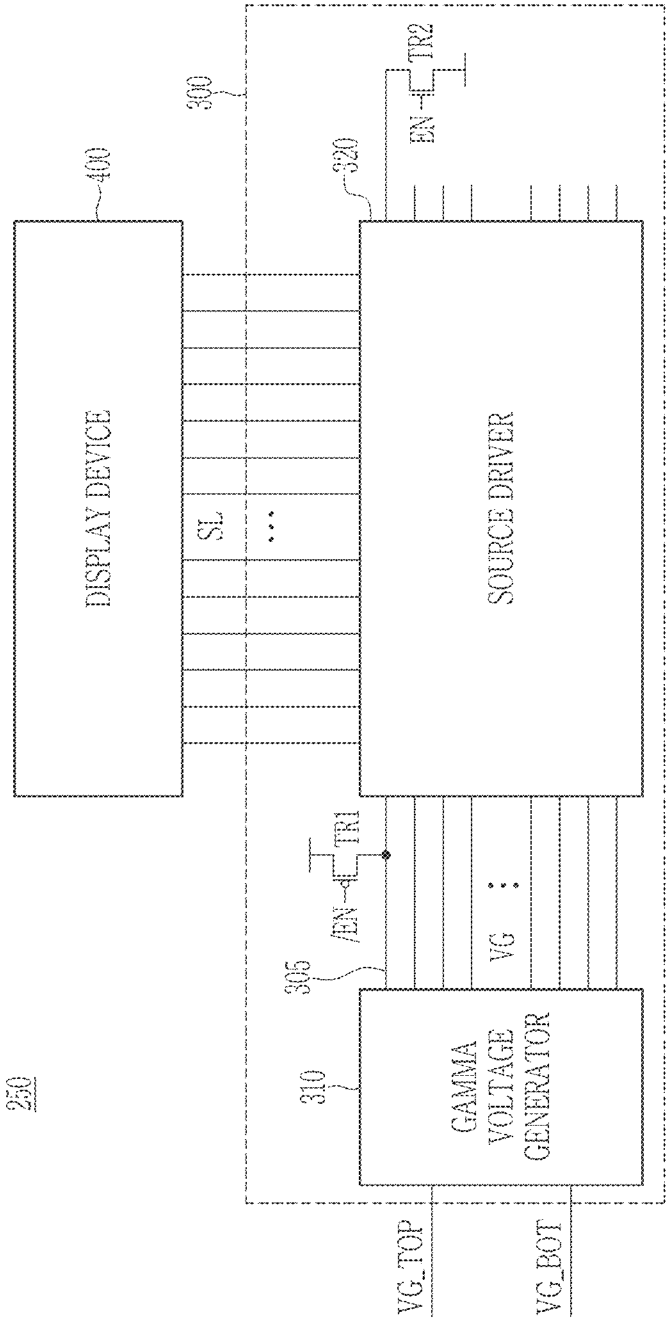
FIG. 2 shows a block diagram of an example of a display device.

FIG. 2 shows a block diagram of an example of a display device.

Referring to FIG. 2, the display device 250 may include a DDI 300 and a display panel 400.

The DDI 300 may transmit data signals to the display panel 400 through source lines SL. The display panel 400 may display images based on the data signals.

The DDI 300 may include a gamma voltage generator 310 and a source driver 320. The gamma voltage generator 310 may receive a minimum gamma voltage VG_BOT and a maximum gamma voltage VG_TOP. In some implementations, an external power source may output the minimum gamma voltage VG_BOT and the maximum gamma voltage VG_TOP to the gamma voltage generator 310. In some implementations, the DDI 300 may further include a reference voltage generator for generating the minimum gamma voltage VG_BOT and the maximum gamma voltage VG_TOP. The reference voltage generator may receive an input voltage from the external power source of the DDI 300, and may generate the minimum gamma voltage VG_BOT and maximum gamma voltage VG_TOP based on the input voltage. In some implementations, the DDI 300 may further include a DC-DC converter for supplying the input voltage to the reference voltage generator.

The gamma voltage generator 310 may generate gamma voltages VG based on the minimum gamma voltage VG_BOT and the maximum gamma voltage VG_TOP. The gamma voltage generator 310 may output the gamma voltages VG to the source driver 320.

The source driver 320 may generate data signals based on the gamma voltages VG. The source driver 320 may output the data signals to the display panel 400 through the source line SLs.

The gamma voltage generator 310 and the source driver 320 may be connected through the gamma lines. That is, the gamma voltage generator 310 may transmit the gamma voltages VG to the source driver 320 through the gamma lines. In this instance, to calculate the resistance component of the gamma lines, the DDI 300 may further include transistors connected to the gamma lines.

For example with the first gamma line 305 of the gamma lines, the DDI 300 may include a first transistor TR1 and a second transistor TR2 connected to the first gamma line 305. The first transistor TR1 and the second transistor TR2 may be different types of transistors. For example, the first transistor TR1 may be a p-channel metal oxide semiconductor (PMOS), and the second transistor TR2 may be an n-channel metal oxide semiconductor (NMOS), and the implementation is not limited thereto.

The first transistor TR1 and the second transistor TR2 may be arranged at respective ends of the first gamma line 305. For example, the first transistor TR1 may be arranged at a front end of the first gamma line 305, and the second transistor TR2 may be arranged at a rear end of the first gamma line 305. The front end of the first gamma line 305 may represent a position before the first gamma line 305 passes through the source driver 320, and the rear end of the first gamma line 305 may represent a position after the first gamma line 305 passes through the source driver 320. The first transistor TR1 may be arranged between the gamma voltage generator 310 and the source driver 320. The first transistor TR1 may be connected to the first gamma line 305 through a drain, and the second transistor TR2 may be connected to the first gamma line 305 through a drain.

The first transistor TR1 and the second transistor TR2 may be used in measuring the resistance component of the first gamma line 305 in the source driver 320. In some implementations, a first driving voltage may be applied to a source of the first transistor TR1, and a second driving voltage may be applied to a source of the second transistor TR2. The first driving voltage and the second driving voltage may respectively be one of voltages generated or used by the display device 250. In some implementations, the maximum gamma voltage VG_TOP may be applied to the source of the first transistor TR1, and the source of the second transistor TR2 may be grounded.

Two signals that are complementary to each other may be input to a gate of the first transistor TR1 and a gate of the second transistor TR2. For example, a not-enable signal/EN may be input to the gate of the first transistor TR1, and an enable signal EN may be input to the gate of the second transistor TR2.

The DDI 300 may further include a controller for controlling a whole operation of the DDI 300. The controller may generate a not-enable signal/EN and an enable signal EN, and may output the signals/EN and EN to the transistors TR1 and TR2 at a time of measuring the resistance component of the first gamma line 305. In some implementations, the DDI 300 may further include an inverter. The controller may generate an enable signal EN and may input the same to the second transistor TR2, and the inverter may invert the enable signal EN to generate a not-enable signal/EN. The inverter may input the not-enable signal/EN to the first transistor TR1.

The controller may measure the resistance component of the first gamma line 305. The controller may measure the current flowing to the first gamma line 305. The controller may determine whether the first gamma line 305 has a defect based on the reference current range. For example, the controller may determine the first gamma line 305 to be abnormal when the measured current value deviates from the reference current range. The controller may determine the first gamma line 305 to be normal when the measured current value is within the reference current range.

The controller may measure the resistance component based on the measured current value and the voltages applied to the respective ends of the first gamma line 305. The controller may calculate the resistance component by dividing the current value by a potential difference at the respective ends of the first gamma line 305. The controller may determine whether the first gamma line 305 has a defect based on the reference resistance range. For example, the controller may determine the first gamma line 305 to be abnormal when calculated resistance deviates from the reference resistance range. The controller may determine the first gamma line 305 to be normal when the calculated resistance is within the reference resistance range.

In some implementations, the external test device of the DDI 300 may measure the current flowing to the first gamma line 305. One end of the test device may be connected to the first transistor TR1 and another end may be connected to the second transistor TR2. The test device may determine the first gamma line 305 to be abnormal when the measured current value deviates from the reference current range. The test device may determine the first gamma line 305 to be normal when the measured current value is within the reference current range. In some implementations, the test device may calculate resistance of the resistance component based on the measured current value. The test device may determine whether the first gamma line 305 has a defect based on the calculated resistance and the reference resistance range.

FIG. 2 shows the first gamma line 305 from among the gamma lines, at least one another gamma line may be connected to two transistors in a like way of the first gamma line 305 and the current or the resistance may be measured.

Figure 3:
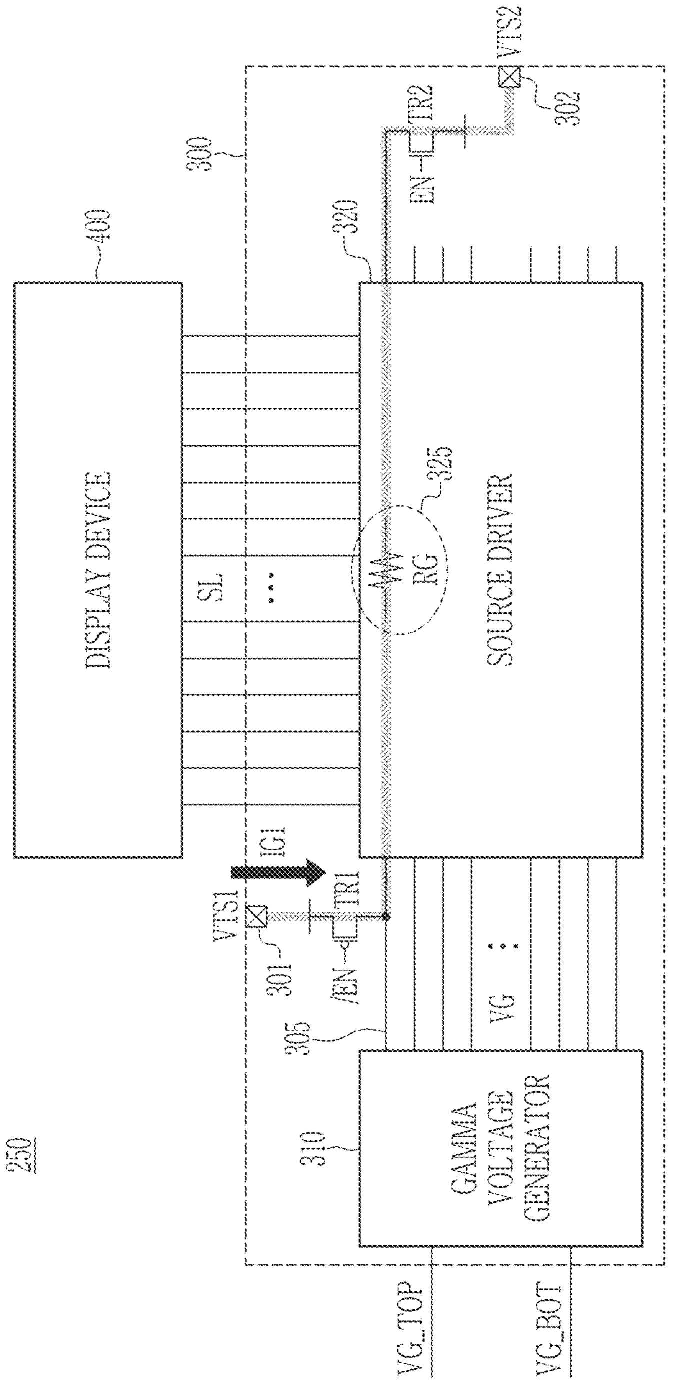
FIG. 3 shows a block diagram of an example of a display device.

FIG. 3 shows a block diagram of an example of a display device.

Referring to FIG. 3, the display device 250 may include a DDI 300 and a display panel 400. The content described with reference to FIG. 2 is identically applied to the display panel 400. Hence, no repeated description will be provided.

The DDI 300 may include a first pad 301 and a second pad 302. A first test voltage VTS1 may be applied through the first pad 301, and the first transistor TR1 may receive the first test voltage VTS1 through the source. A second test voltage VTS2 may be applied through the second pad 302, and the second transistor TR2 may receive the second test voltage VTS2 through the source. In some implementations, the respective first test voltage VTS1 and the second test voltage VTS2 may be one of the voltages generated or used by the display device 250. In some implementations, the respective first test voltage VTS1 and the second test voltage VTS2 may be voltages generated by the external test device for a test purpose.

A current IG1 may flow to the first gamma line 305 by the first test voltage VTS1 of the first pad 301, the second test voltage VTS2 of the second pad 302, and the resistance component 325 of the first gamma line 305. The controller of the DDI 300 may measure a value of the current IG1.

The controller of the DDI 300 may calculate resistance RG of the resistance component 325 as expressed in Equation 1.

$$RG = \frac{VTS1 - VTS2}{IG1} \quad \text{(Equation 1)}$$

Here, RG is resistance (ohm) of the resistance component 325, VTS1 is the value (volt) of the first test voltage VTS1, VTS2 is the value (volts) of the second test voltage VTS2, and IG1 is the value (Ampere) of the current IG1.

The controller may determine whether the first gamma line 305 has a defect based on the value of the measured current IG1 or the calculated resistance RG. In some implementations, the controller may determine the first gamma line 305 to be normal when the value of the measured current IG1 is within the reference current range, and it may determine the first gamma line 305 to be abnormal when the value of the measured current IG1 deviates from the reference current range. In some implementations, the controller may determine the first gamma line 305 to be normal when the calculated resistance RG is within the reference resistance range, and it may determine the first gamma line 305 to be abnormal when the calculated resistance RG deviates from the reference resistance range.

In some implementations, the external test device of the DDI 300 may measure the current IG1 flowing to the first gamma line 305. One end of the test device may be connected to the first transistor TR1 and another end may be connected to the second transistor TR2. The test device may determine the first gamma line 305 to be abnormal when the measured current value of the current IG1 deviates from the reference current range. The test device may determine the first gamma line 305 to be normal when the measured current value of the current IG1 is within the reference current range. In some implementations, the test device may calculate the resistance RG of the resistance component 325 based on the measured current value. The test device may determine whether the first gamma line 305 has a defect based on the calculated resistance RG and the reference resistance range.

FIG. 3 shows the first gamma line 305 from among the gamma lines, at least one another gamma line may be connected to two transistors in a like way of the first gamma line 305 and the current or the resistance may be measured.

Figure 4:
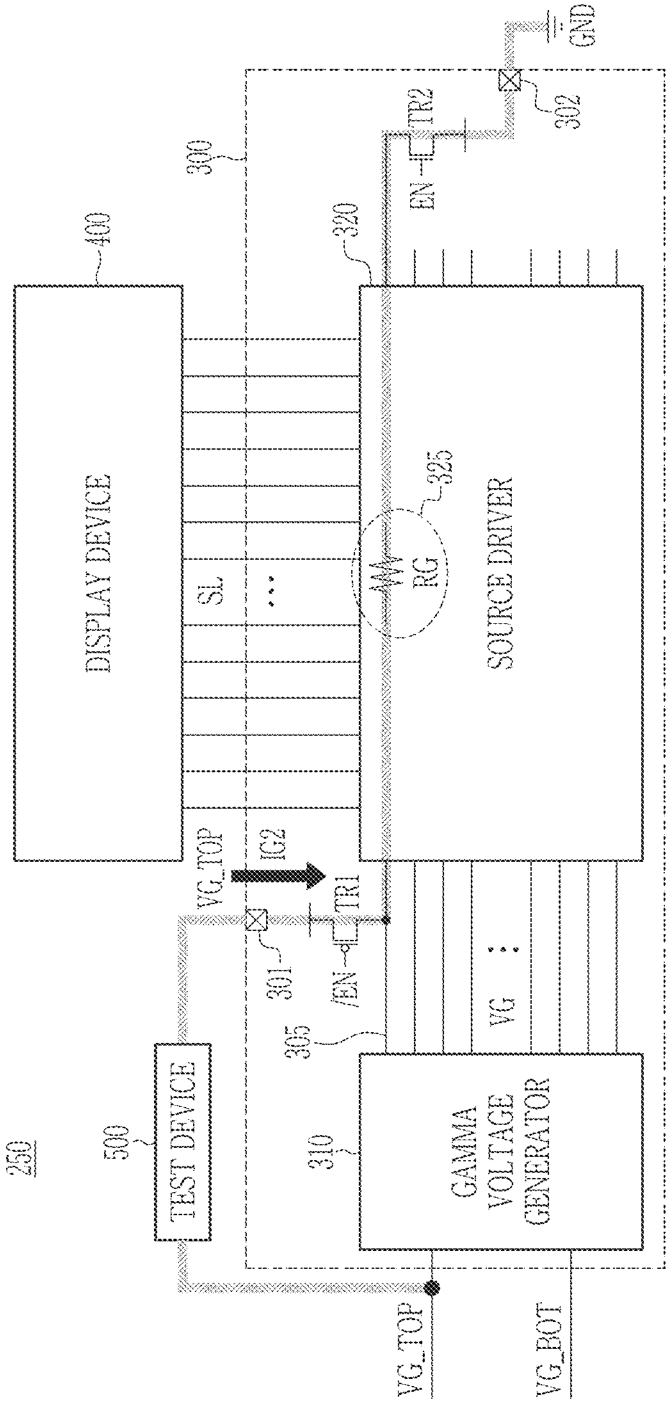
FIG. 4 shows a block diagram of an example of a display device.

FIG. 4 shows a block diagram of an example of a display device.

Referring to FIG. 4, the display device 250 may include a DDI 300 and a display panel 400. The content described with reference to FIG. 2 is identically applied to the display panel 400. Hence, no repeated description will be provided.

The DDI 300 may include a first pad 301 and a second pad 302. The maximum gamma voltage VG_TOP is applied through the first pad 301, and the first transistor TR1 may receive the maximum gamma voltage VG_TOP through the source. The maximum gamma voltage VG_TOP may be one of the voltages input to the gamma voltage generator 310. The second pad 302 may be connected to a ground (GND), and the source of the second transistor TR2 may be connected to the ground (GND). In some implementations, the minimum gamma voltage VG_BOT may be applied through the second pad 302, and the second transistor TR2 may receive the minimum gamma voltage VG_BOT through the source.

A current IG2 may flow to the first gamma line 305 by the maximum gamma voltage VG_TOP of the first pad 301 and the resistance component 325 of the first gamma line 305. The test device 500 may measure the current IG2 flowing to the first gamma line 305. The test device 500 may be connected to a line for supplying the maximum gamma voltage VG_TOP through the first pad 301.

The test device 500 may determine the first gamma line 305 to be abnormal when the measured current value of the current IG2 deviates from the reference current range. The test device 500 may determine the first gamma line 305 to be normal when the measured current value of the current IG2 is within the reference current range.

The test device 500 may calculate the resistance RG of the resistance component 325 as expressed in Equation 2.

$$RG = \frac{\text{VG\_TOP}}{IG2} \quad \text{(Equation 2)}$$

Here, RG is resistance (ohm) of the resistance component 325, VG_TOP is the value (volts) of the maximum gamma voltage VG_TOP, and IG2 is the value of the current IG2.

The test device 500 may determine whether the first gamma line 305 has a defect based on the calculated resistance RG and the reference resistance range. The test device 500 may determine the first gamma line 305 to be normal when the calculated resistance RG is within the reference resistance range, and it may determine the first gamma line 305 to be abnormal when the calculated resistance RG deviates from the reference resistance range.

In some implementations, the controller of the DDI 300 may measure the current IG2, and may determine whether the first gamma line 305 has a defect based on the measured current value and the reference current range. In some implementations, the controller of the DDI 300 may calculate resistance RG of the resistance component 325, and may determine whether the first gamma line 305 has a defect based on the resistance RG and the reference resistance range.

FIG. 4 shows the first gamma line 305 from among the gamma lines, at least one another gamma line may be connected to two transistors in a like way of the first gamma line 305 and the current or the resistance may be measured.

Figure 5:
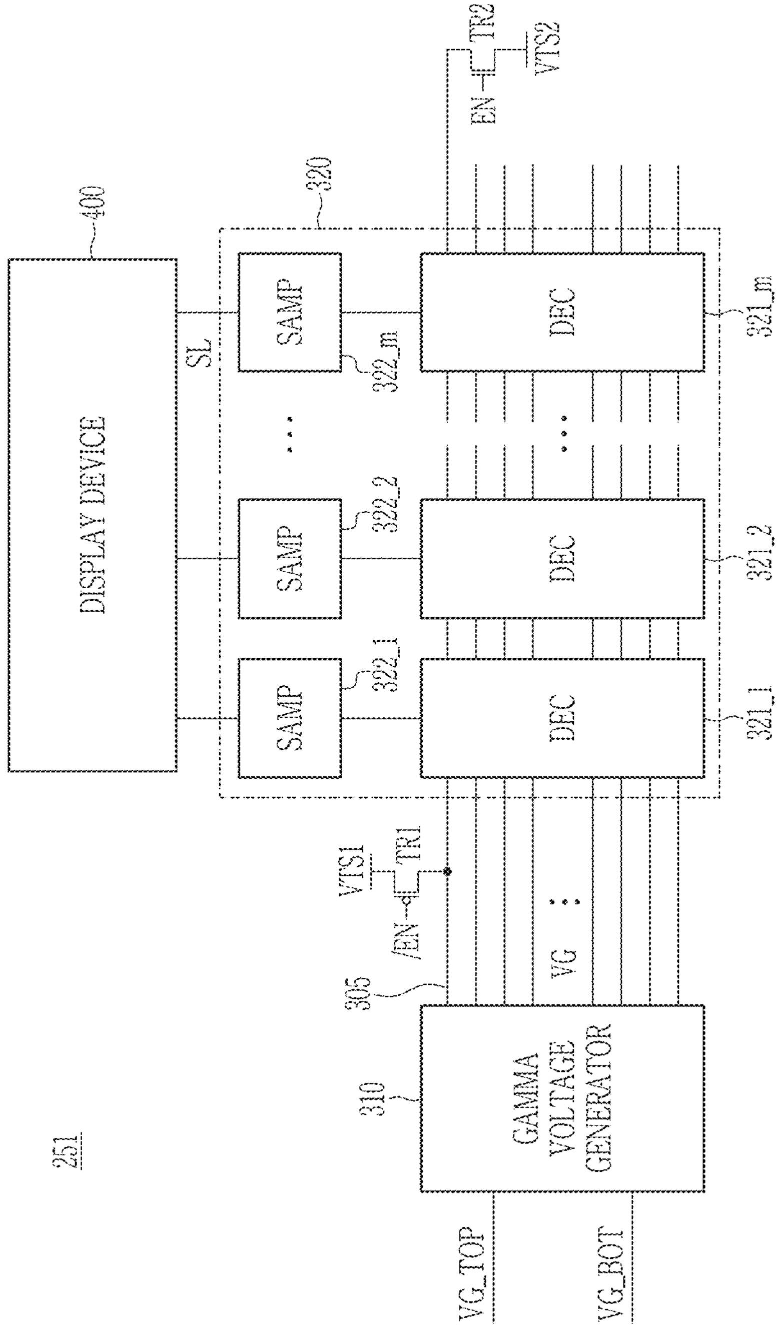
FIG. 5 shows a block diagram of an example of a display device.

FIG. 5 shows a block diagram of an example of a display device.

Referring to FIG. 5, the display device 251 may include a DDI 300 and a display panel 400. The DDI 300 may include a gamma voltage generator 310 and a source driver 320. The content described with reference to FIG. 2 is identically applied to the gamma voltage generator 310 and the display panel 400. Hence, no repeated description will be provided.

The source driver 320 may include decoders 321_1 to 321_$m$ (m is an integer that is greater than 1) and source amplifiers 322_1 to 322_$m$. The decoders 321_1 to 321_$m$ may correspond to the source amplifiers 322_1 to 322_$m$ and may be connected to the same.

The decoders 321_1 to 321_$m$ may receive the gamma voltages VG from the gamma voltage generator 310.

The respective decoders 321_1 to 321_$m$ may select one of the gamma voltages VG based on the input image signals. In some implementations, the controller of the DDI 300 may sample the input image signals, and may output the sampled signals to the decoders 321_1 to 321__m_. The decoders 321_1 to 321__m_ may select one of the gamma voltages VG based on the sampled signals. The respective decoders 321_1 to 321__m_ may output the selected voltages to the source amplifiers 322_1 to 322__m_.

The source amplifiers 322_1 to 322__m_ may amplify the gamma voltages selected by the decoders 321_1 to 321__m_ to generate data signals. The source amplifiers 322_1 to 322__m_ may transmit data signals to the display panel 400 through the source lines SL. The display panel 400 may display images based on the data signals.

The gamma voltage generator 310 and the decoders 321_1 to 321__m_ may be connected by the gamma lines. That is, the gamma voltage generator 310 may transmit the gamma voltages VG to the decoders 321_1 to 321__m_ through the gamma lines. In this instance, to calculate the resistance component of the gamma lines, the DDI 300 may further include transistors connected to the gamma lines.

For example with the first gamma line 305 of the gamma lines, the DDI 300 may include a first transistor TR1 and a second transistor TR2 connected to the first gamma line 305. The first transistor TR1 and the second transistor TR2 may be different types of transistors. For example, the first transistor TR1 may be a PMOS transistor, and the second transistor TR2 may be an NMOS transistor, and the implementation is not limited thereto.

The first transistor TR1 and the second transistor TR2 may be arranged at respective ends of the first gamma line 305. For example, the first transistor TR1 may be arranged at a front end of the first gamma line 305, and the second transistor TR2 may be arranged at a rear end of the first gamma line 305. The front end of the first gamma line 305 may represent a position before the first gamma line 305 passes through the decoders 321_1 to 321__m_, and the rear end of the first gamma line 305 may represent a position after the first gamma line 305 passes through the decoders 321_1 to 321__m_. The first transistor TR1 may be arranged between the gamma voltage generator 310 and the first decoder 321_1. The first decoder 321_1 may be firstly connected to the gamma lines (e.g., first gamma line 305) from among the decoders 321_1 to 321__m_. The first transistor TR1 may be connected to the first gamma line 305 through the drain, and the second transistor TR2 may be connected to the first gamma line 305 through the drain.

The first transistor TR1 and the second transistor TR2 may be used in measuring the resistance component of the first gamma line 305 in the decoders 321_1 to 321__m_. The content described with reference to FIG. 3 or FIG. 4 may be identically applied to an element for measuring the resistance component of the first gamma line 305. Hence, no repeated description will be provided.

Figure 6:
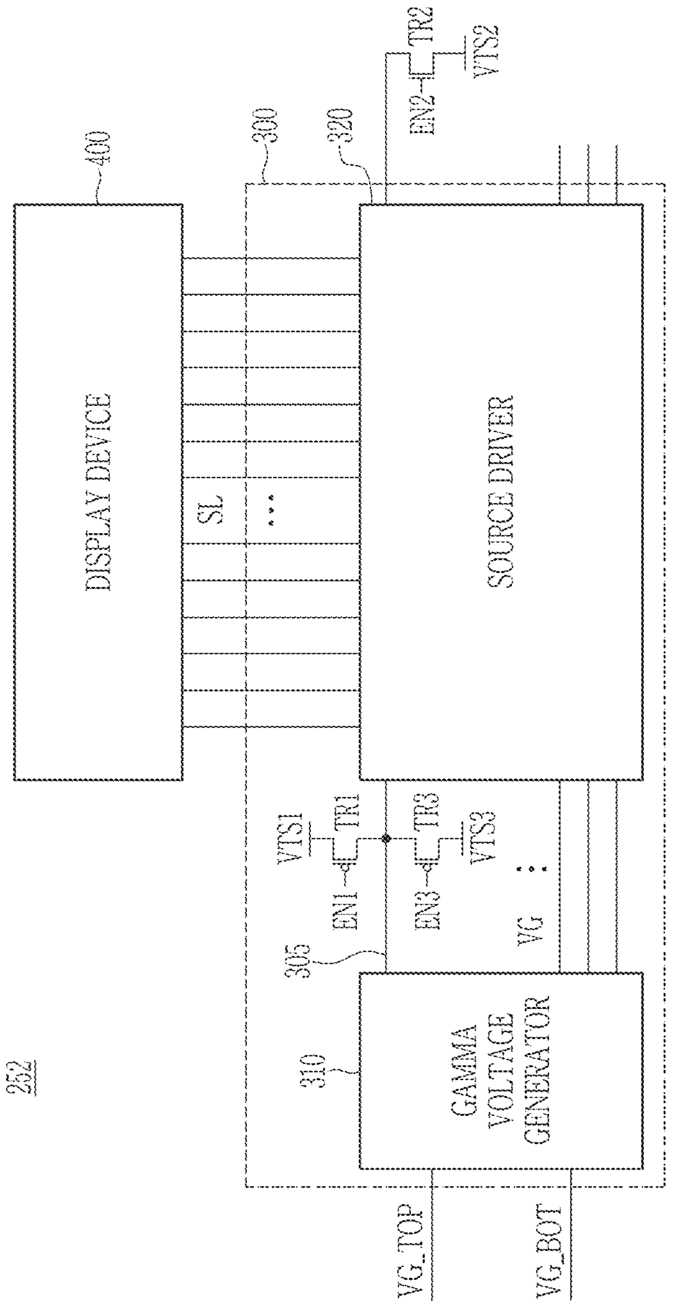
FIG. 6 shows a block diagram of an example of a display device.

FIG. 6 shows a block diagram of an example of a display device.

Referring to FIG. 6, the display device 252 may include a DDI 300 and a display panel 400. The DDI 300 may include a gamma voltage generator 310 and a source driver 320. The content described with reference to FIG. 2 is identically applied to the gamma voltage generator 310, the source driver 320, and the display panel 400. Hence, no repeated description will be provided.

The gamma voltage generator 310 and the source driver 320 may be connected through the gamma lines. That is, the gamma voltage generator 310 may transmit the gamma voltages VG to the source driver 320 through the gamma lines. In this instance, the DDI 300 may further include transistors connected to the gamma lines for a stress test of the DDI 300. The stress test may be provided to determine whether the DDI 300 has a defect based on the outputs (e.g., voltage, current, etc.,) of the DDI 300 when a specific range of the voltage is applied. The DDI 300 including the gamma line determined to have a defect through the stress test may be screened.

For example with the first gamma line 305 of the gamma lines, the DDI 300 may include a first transistor TR1, a second transistor TR2, and a third transistor TR3 connected to the first gamma line 305. The first to third transistors TR1 to TR3 may be different types of transistors. For example, the first transistor TR1 may be a PMOS transistor, and the second and third transistors TR2 and TR3 may be NMOS transistors, and the implementation is not limited thereto.

The first to third transistors TR1 to TR3 may be arranged at respective ends of the first gamma line 305. For example, the first and third transistors TR1 and TR3 may be arranged at the front end of the first gamma line 305, and the second transistor TR2 may be arranged at the rear end of the first gamma line 305. The front end of the first gamma line 305 may represent a position before the first gamma line 305 passes through the source driver 320, and the rear end of the first gamma line 305 may represent a position after the first gamma line 305 passes through the source driver 320. The first and third transistors TR1 and TR3 may be arranged between the gamma voltage generator 310 and the source driver 320. The first transistor TR1 may be connected to the first gamma line 305 through the drain, and the second and third transistors TR2 and TR3 may be connected to the first gamma line 305 through the drain.

The first to third transistors TR1 to TR3 may be used in the stress test for the first gamma line 305 in the source driver 320. In some implementations, the first test voltage VTS1 may be applied to the source of the first transistor TR1, the second test voltage VTS2 may be applied to the source of the second transistor TR2, and the third test voltage VTS3 may be applied to the source of the third transistor TR3. The first to third test voltages VTS1 to VTS3 may be one of the voltages generated or used by the display device 252. In some implementations, the maximum gamma voltage VG_TOP may be applied to the source of the first transistor TR1, and the sources of the second and third transistors TR2 and TR3 may be grounded.

Different signals may be input to the gates of the first to third transistors TR1 to TR3. For example, first to third signals EN1 to EN3 may be input to the gates of the first to third transistors TR1 to TR3. In some implementations, the first signal EN1 and the third signal EN3 may be complementary to each other. The second signal EN2 may be obtained by a logical OR operation on the first signal EN1 and the third signal EN3. That is, when the first transistor TR1 is in an On-state, the third transistor TR3 is in an Off-state, and vice versa. When the first transistor TR1 or the third transistor TR3 is in an On-state, the second transistor TR2 is in an On-state. Hence, a full-swing voltage between the first test voltage VTS1 and the third test voltage VTS3 may be applied to the first gamma line 305.

The DDI 300 may further include a controller for controlling a general operation of the DDI 300. The controller may generate first to third signals EN1 to EN3, and may output the first to third signals EN1 to EN3 to the first to third transistors TR1 to TR3 at the test time of the first gamma line 305. In some implementations, the DDI 300 may further include an inverter. The controller may generate the first signal EN1 and may input the same to the first transistor TR1, and the inverter may invert the first signal EN1 to generate a third signal EN3. The inverter may input the third signal EN3 to the third transistor TR3. In some implementations, the DDI 300 may further include a logical OR circuit (or an OR gate circuit). The logical OR circuit may generate the second signal EN2 by performing a logical OR operation on the first signal EN1 and the third signal EN3. The logical OR circuit may input the second signal EN2 to the second transistor TR2.

When the first gamma line 305 applies a voltage to the source driver 320, the controller may determine whether the DDI 300 has a defect based on the voltage (or current) output by the source driver 320. The first gamma line 305 may apply a full-swing voltage between the first test voltage VTS1 and the third test voltage VTS3 to the source driver 320. The controller may determine whether the DDI 300 has a defect based on the first reference voltage range and the second reference voltage range. For example, the first reference voltage range may have a voltage range including the first test voltage VTS1, and the second reference voltage range may have a voltage range including the third test voltage VTS3. The controller may determine the DDI 300 to be normal when the voltage output by the source driver 320 is within the first reference voltage range and the second reference voltage range. For example, the controller may determine the DDI 300 to be normal when the maximum value of the voltage output by the source driver 320 is within the first reference voltage range, and the minimum value is within the second reference voltage range. In some implementations, the controller may determine whether the DDI 300 has a defect based on a waveform of the voltage output by the source driver 320.

In some implementations, a test device outside the DDI 300 may be connected to the source driver 320 and may measure the voltage (or current) of the source driver 320. The test device may determine the first gamma line 305 to be abnormal when the measured voltage value deviates from the reference voltage range. The test device may determine the first gamma line 305 to be normal when the measured current value is within the reference voltage range.

FIG. 6 shows the first gamma line 305 from among the gamma lines, and at least one another gamma line may be connected to two transistors in a like way of the first gamma line 305 and the voltage may be measured.

Figure 7:
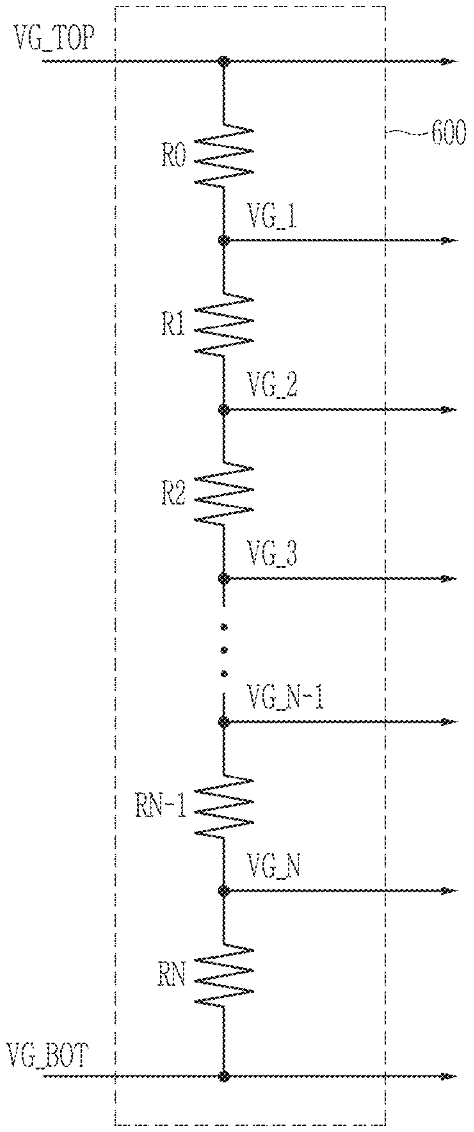
FIG. 7 shows a circuit diagram of an example of a gamma voltage generator.

FIG. 7 shows a circuit diagram of an example of a gamma voltage generator.

Referring to FIG. 7, the gamma voltage generator 600 may include resistors R0 to RN (N is an integer that is greater than 1). The resistors R0 to RN may be a resistor string coupled in series. The gamma voltage generator 600 may generate first to N-th gamma voltages VG_1 to VG_N by dividing between a section the maximum gamma voltage VG_TOP and the minimum gamma voltage VG_BOT. The gamma voltage generator 600 may output the first to N-th gamma voltages VG_1 to VG_N between the maximum gamma voltage VG_TOP and the minimum gamma voltage VG_BOT divided by the resistors R0 to RN as the gamma voltages VG together with the maximum gamma voltage VG_TOP and the minimum gamma voltage VG_BOT.

Figure 8:
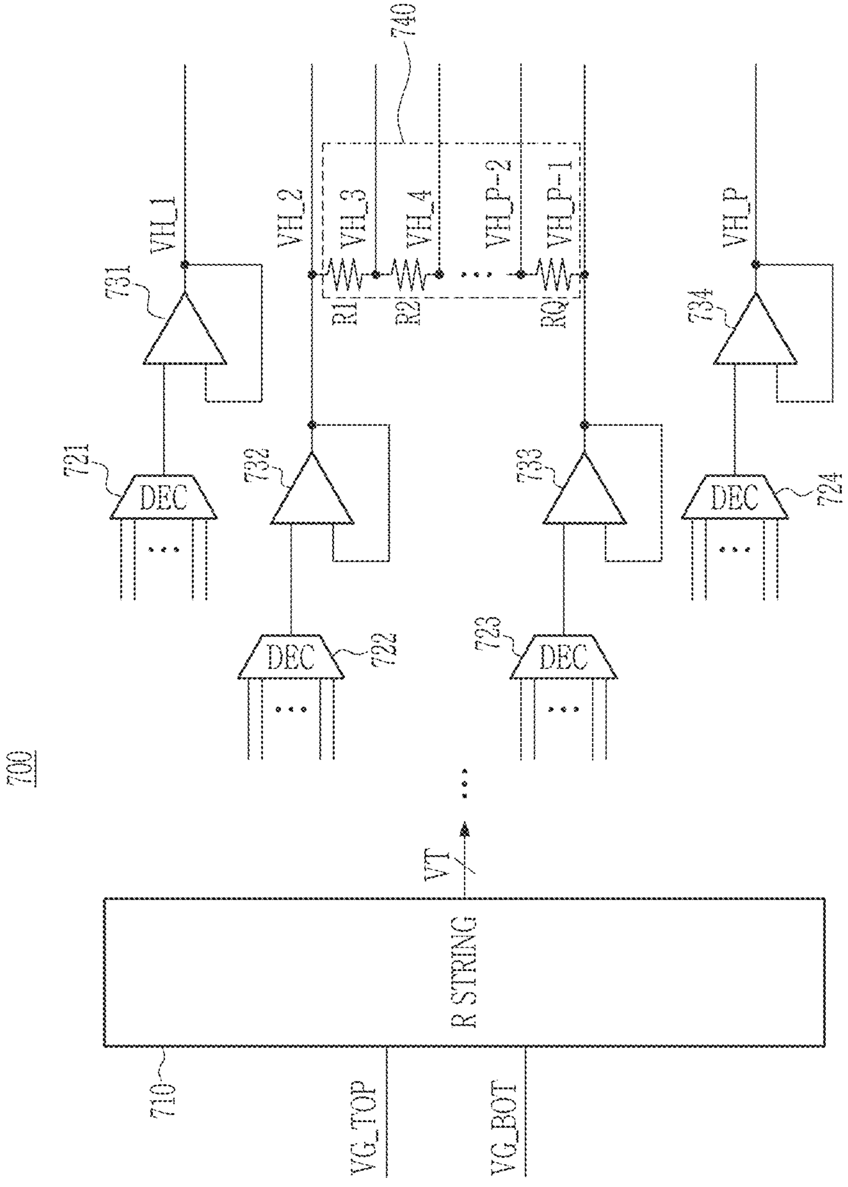
FIG. 8 shows a circuit diagram of an example of a gamma voltage generator.

FIG. 8 shows a circuit diagram of an example of a gamma voltage generator.

Referring to FIG. 8, the gamma voltage generator 700 may include a first resistor string (R string) 710, decoders 721 to 724, amplifiers 731 to 734, and a second resistor string 740. According to the implementation, the gamma voltage generator 700 may further include at least one resistor string, at least one decoder, and at least one amplifier.

The first resistor string 710 may include resistors coupled in series. The first resistor string 710 may generate voltages VT by dividing a space between the maximum gamma voltage VG_TOP and the minimum gamma voltage VG_BOT. The first resistor string 710 may output the voltages between the maximum gamma voltage VG_TOP and the minimum gamma voltage VG_BOT divided by the resistors as voltages VT together with the maximum gamma voltage VG_TOP and the minimum gamma voltage VG_BOT.

The decoders 721 to 724 may select one of the voltages. For example, the decoders 721 to 724 may receive a voltage selecting signal from the controller of the DDI, and may select one of the voltages based on the voltage selecting signal.

The voltages received by the decoders 721 to 724 may be voltages that are based on the voltages VT output by the first resistor string 710. In some implementations, at least one of the decoders 721 to 724 may receive the voltages VT output by the first resistor string 710 and may select one of the voltages VT. In some implementations, at least one of the decoders 721 to 724 may select one of the voltages generated by at least two resistor strings. For example, the at least two resistor strings may include a first resistor string 710 and an additional resistor string. The additional resistor string may receive the voltages VT from the first resistor string 710 and may generate secondary voltages. At least one of the decoders 721 to 724 may select one of the secondary voltages.

The amplifiers 731 to 734 may amplify the voltage selected by the decoders 721 to 724. For example, the amplifiers 731 to 734 may generate voltage VH1, VH2, VH_P-2, and VH_P-1 (P is an integer that is greater than 2) by amplifying the selected voltage. In this instance, the amplifiers 732 and 733 may output the voltages VH_2 and VH_P-1 to the second resistor string 740.

The second resistor string 740 may include resistors R1 to RQ (Q is an integer that is greater than 3). Q may be an integer than is less than P by 3. The second resistor string 740 may generate voltages VH_3 to VH_P-2 by dividing a gap between the voltage VH_2 and the voltage VH_P-1. The second resistor string 740 may output the voltages VH_3 to VH_P-2 generated by the resistors R1 to RQ together with the voltage VH_2 and the voltage VH_P-1. The voltages VH_1 to VH_P output by the amplifiers 731 to 734 and the second resistor string 740 may be input to the source driver of the DDI as the gamma voltages. The source driver may generate data signals based on the voltages VH_1 to VH_P.

Figure 9:
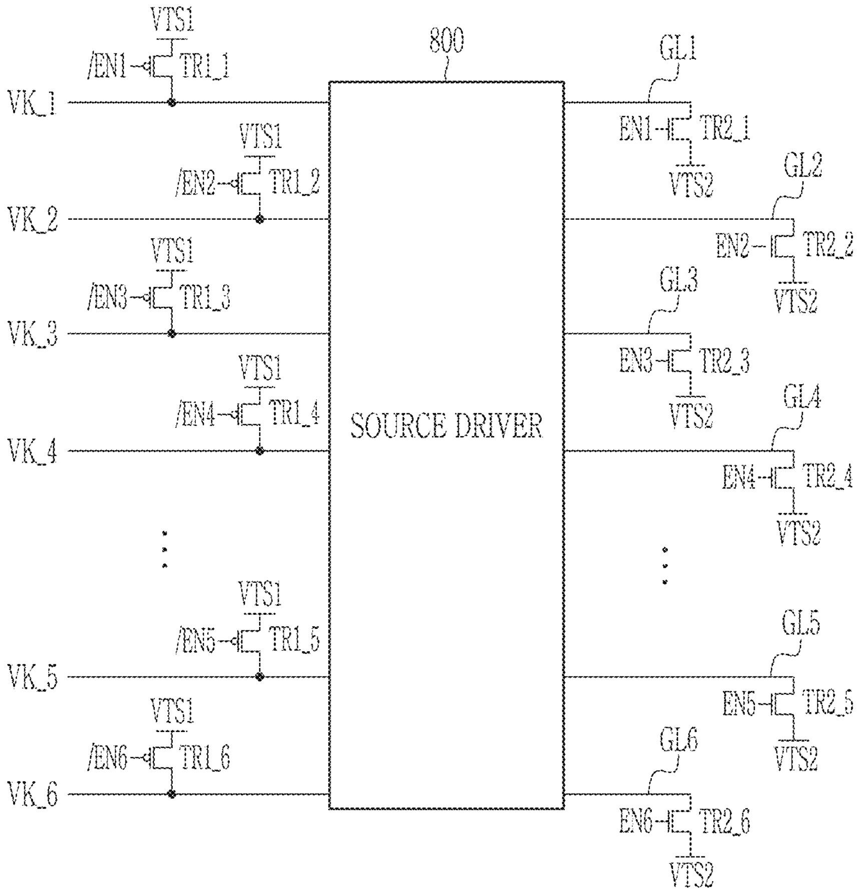
FIG. 9 shows a block diagram of an example of a source driver.
Figure 10:
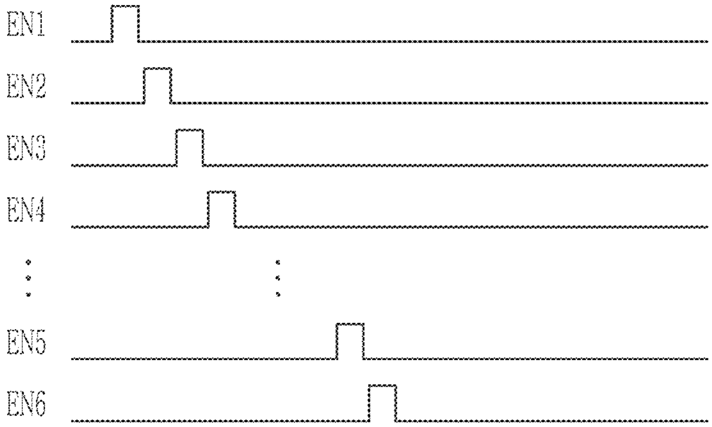
FIG. 10 shows a timing diagram of an example of an enable signal.

FIG. 9 shows a block diagram of an example of a source driver, and FIG. 10 shows a timing diagram of an example of an enable signal.

Referring to FIG. 9, the source driver 800 may receive gamma voltages VK_1 to VK_6. The source driver 800 may generate data signals based on the gamma voltages VK_1 to VK_6.

The source driver 800 may receive the gamma voltages VK_1 to VK_6 through the gamma lines GL1 to GL6. In this instance, when the gamma lines GL1 to GL6 have defects such as non-uniform resistance components, the source driver 800 has a difficulty in normally receiving the gamma voltages VK_1 to VK_6. Hence, to determine whether the gamma lines GL1 to GL6 have defects, the gamma lines GL1 to GL6 may be connected to the first transistors TR1_1 to TR1_6 and the second transistors TR2_1 to TR2_6. The first transistors TR1_1 to TR1_6 and the second transistors TR2_1 to TR2_6 may be different types of transistors. For example, the first transistors TR1_1 to TR1_6 may be PMOS transistors, the second transistors TR2_1 to TR2_6 may be NMOS transistors, and the implementation is not limited thereto. The drains of the first transistors TR1_1 to TR1_6 and the drains of the second transistors TR2_1 to TR2_6 may be connected to the gamma lines GL1 to GL6.

The first transistors TR1_1 to TR1_6 and the second transistors TR2_1 to TR2_6 may be used in measuring the resistance component of the gamma lines GL1 to GL6 in the source driver 800. In some implementations, the first test voltage VTS1 may be applied to the sources of the first transistors TR1_1 to TR1_6, and the second test voltage VTS2 may be applied to the sources of the second transistors TR2_1 to TR2_6. The respective first and second test voltages VTS1 and VTS2 may be one of the voltages generated or used by the display device. In some implementations, the maximum gamma voltage VG_TOP may be applied to the sources of the first transistors TR1_1 to TR1_6, and the sources of the second transistors TR2_1 to TR2_6 may be grounded.

Two signals that are complementary to each other may be input to the gates of the first transistors TR1_1 to TR1_6 and the gates of the second transistors TR2_1 to TR2_6. For example, not-enable signals/EN1 to/EN6 may be input to the gates of the first transistors TR1_1 to TR1_6, and enable signals EN1 to EN6 may be input to the gates of the second transistors TR2_1 to TR2_6.

The controller of the DDI may generate the not-enable signals/EN1 to/EN6 and the enable signals EN1 to EN6.

Referring to FIG. 9 and FIG. 10, the controller may generate enable signals EN1 to EN6. The enable signals EN1 to EN6 may have different logic level transition times. For example, when the first enable signal EN1 transitions to a second level (e.g., low) from a first level (e.g., high), the second enable signal EN2 may transition to the first level from the second level. That is, the controller may generate the enable signals EN1 to EN6 of which the first levels do not overlap each other in a time region. The enable signals EN1 to EN6 may have a same pulse width. The controller may generate the not-enable signal/EN1 to/EN6 in a like way of generating the enable signals EN1 to EN6.

When the first enable signal EN1 transitions to the first level from the second level and the first not-enable signal/EN1 transitions to the second level from the first level, the current may flow to the first gamma line GL1 because of a potential difference between the first test voltage VTS1 at the source of the first transistor TR1_1 and the second test voltage VTS2 at the source of the second transistor TR2_1. The controller may measure the current flowing to the first gamma line GL1. The controller may determine whether the first gamma line GL1 has a defect based on the measured current and the reference current range. The controller may calculate resistance of the first gamma line GL1 based on the measured current and the potential difference between the first test voltage VTS1 and the second test voltage VTS2. The controller may determine whether the first gamma line GL1 has a defect based on the calculated resistance and the reference resistance range. The controller may determine whether the other gamma lines GL2 to GL6 have defects in a like way of the first gamma line GL1.

In some implementations, the test device may determine at least one of the current and resistance of the gamma lines GL1 to GL6, and may determine whether the gamma lines GL1 to GL6 have defects based on at least one of the determined current value and resistance.

Figure 11:
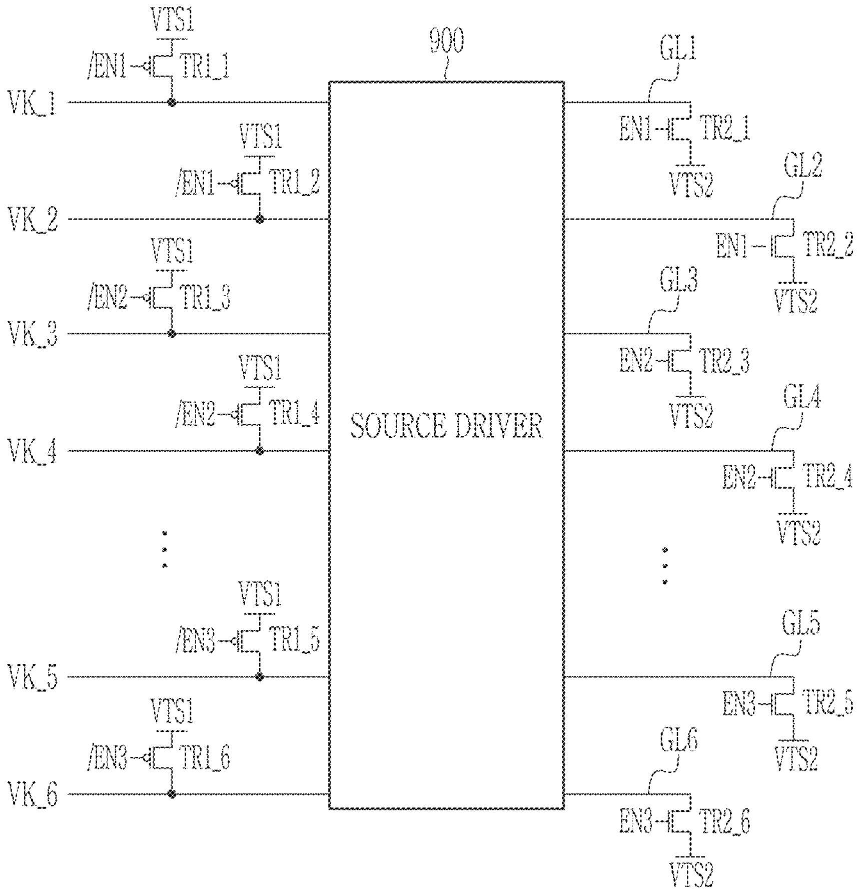
FIG. 11 shows a block diagram of an example of a source driver.
Figure 12:
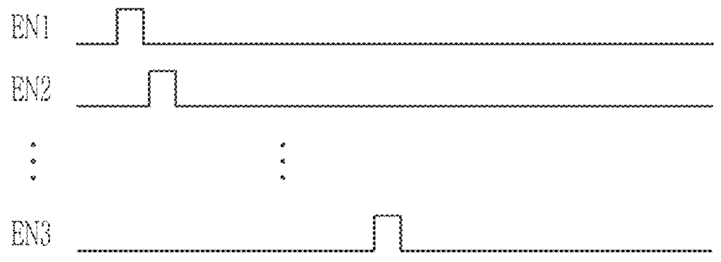
FIG. 12 shows a timing diagram of an example of an enable signal.

FIG. 11 shows a block diagram of an example of a source driver, and FIG. 12 shows a timing diagram of an example of an enable signal.

Referring to FIG. 11, the source driver 900 may receive gamma voltages VK_1 to VK_6. The source driver 900 may generate data signals based on the gamma voltages VK_1 to VK_6.

The source driver 900 may receive the gamma voltages VK_1 to VK_6 through the gamma lines GL1 to GL6. In this instance, when the gamma lines GL1 to GL6 have defects such as non-uniform resistance components, the source driver 900 has a difficulty in normally receiving the gamma voltages VK_1 to VK_6. Hence, to determine whether the gamma lines GL1 to GL6 have defects, the gamma lines GL1 to GL6 may be connected to the first transistors TR1_1 to TR1_6 and the second transistors TR2_1 to TR2_6. The first transistors TR1_1 to TR1_6 and the second transistors TR2_1 to TR2_6 may be different types of transistors. For example, the first transistors TR1_1 to TR1_6 may be PMOS transistors, the second transistors TR2_1 to TR2_6 may be NMOS transistors, and the implementation is not limited thereto. The drains of the first transistors TR1_1 to TR1_6 and the drains of the second transistors TR2_1 to TR2_6 may be connected to the gamma lines GL1 to GL6.

The first transistors TR1_1 to TR1_6 and the second transistors TR2_1 to TR2_6 may be used in measuring the resistance component of the gamma lines GL1 to GL6 in the source driver 800. In some implementations, the first test voltage VTS1 may be applied to the sources of the first transistors TR1_1 to TR1_6, and the second test voltage VTS2 may be applied to the sources of the second transistors TR2_1 to TR2_6. The respective first and second test voltages VTS1 and VTS2 may be one of the voltages generated or used by the display device. In some implementations, the maximum gamma voltage VG_TOP may be applied to the sources of the first transistors TR1_1 to TR1_6, and the sources of the second transistors TR2_1 to TR2_6 may be grounded.

Two signals that are complementary to each other may be input to the gates of the first transistors TR1_1 to TR1_6 and the gates of the second transistors TR2_1 to TR2_6. For example, not-enable signals/EN1 to/EN3 may be input to the gates of the first transistors TR1_1 to TR1_6, and enable signals EN1 to EN3 may be input to the gates of the second transistors TR2_1 to TR2_6.

The controller of the DDI may generate the not-enable signals/EN1 to/EN6 and the enable signals EN1 to EN6.

Referring to FIG. 11 and FIG. 12, the controller may generate enable signals EN1 to EN3. The enable signals EN1 to EN3 may have different logic level transition times. For example, when the first enable signal EN1 transitions to a second level (e.g., low) from a first level (e.g., high), the second enable signal EN2 may transition to the first level from the second level. That is, the controller may generate the enable signals EN1 to EN3 of which the first levels do not overlap each other in a time region. The enable signals EN1 to EN3 may have the same pulse width. The controller may generate the not-enable signal/EN1 to/EN3 in a like way of generating the enable signals EN1 to EN3.

When the first enable signal EN1 transitions to the first level from the second level and the first not-enable signal/EN1 transitions to the second level from the first level, the current may flow to the first gamma line GL1 because of a potential difference between the first test voltage VTS1 at the source of the first transistor TR1_1 and the second test voltage VTS2 at the source of the second transistor TR2_1. Further, the current may flow to the second gamma line GL2 because of the potential difference between the first test voltage VTS1 at the source of the first transistor TR1_2 and the second test voltage VTS2 at the source of the second transistor TR2_2. The controller may measure a sum of the currents flowing to the first gamma line GL1 and the second gamma line GL2. The controller may determine whether the first gamma line GL1 and the second gamma line GL2 have defects based on the measured current and the reference current range.

As the controller measures the current of one gamma line in FIG. 9, and the controller measures the currents of two gamma lines in FIG. 11, the reference current range in FIG. 9 may be different from the reference current range in FIG. 11. For example, the reference current range in FIG. 9 may be lower than the reference current range in FIG. 11.

The controller may calculate combined resistance of the first gamma line GL1 and the second gamma line GL2 based on the measured current and the potential difference between first test voltage VTS1 and the second test voltage VTS2. The controller may determine whether the first gamma line GL1 and the second gamma line GL2 have defects based on the calculated resistance and the reference resistance range. The controller may determine whether the remaining gamma lines GL3 to GL6 have defects in a like way of the first gamma line GL1 and the second gamma line GL2.

In some implementations, the test device may determine at least one of the current and resistance of the gamma lines GL1 to GL6, and may determine whether the gamma lines GL1 to GL6 have defects based on the at least one of the determined current values and resistance.

FIG. 11 and FIG. 12 show that the same enable signal (e.g., EN1) and the not-enable signal (e.g.,/EN1) are applied to the two gamma lines (e.g., GL1 and GL2) and the currents or resistance of the two gamma lines are measured, and the implementation is not limited thereto, and the controller may measure the currents or resistance of at least three gamma lines. That is, the time of screening the DDI may be reduced by simultaneously testing the gamma lines.

Figure 13:
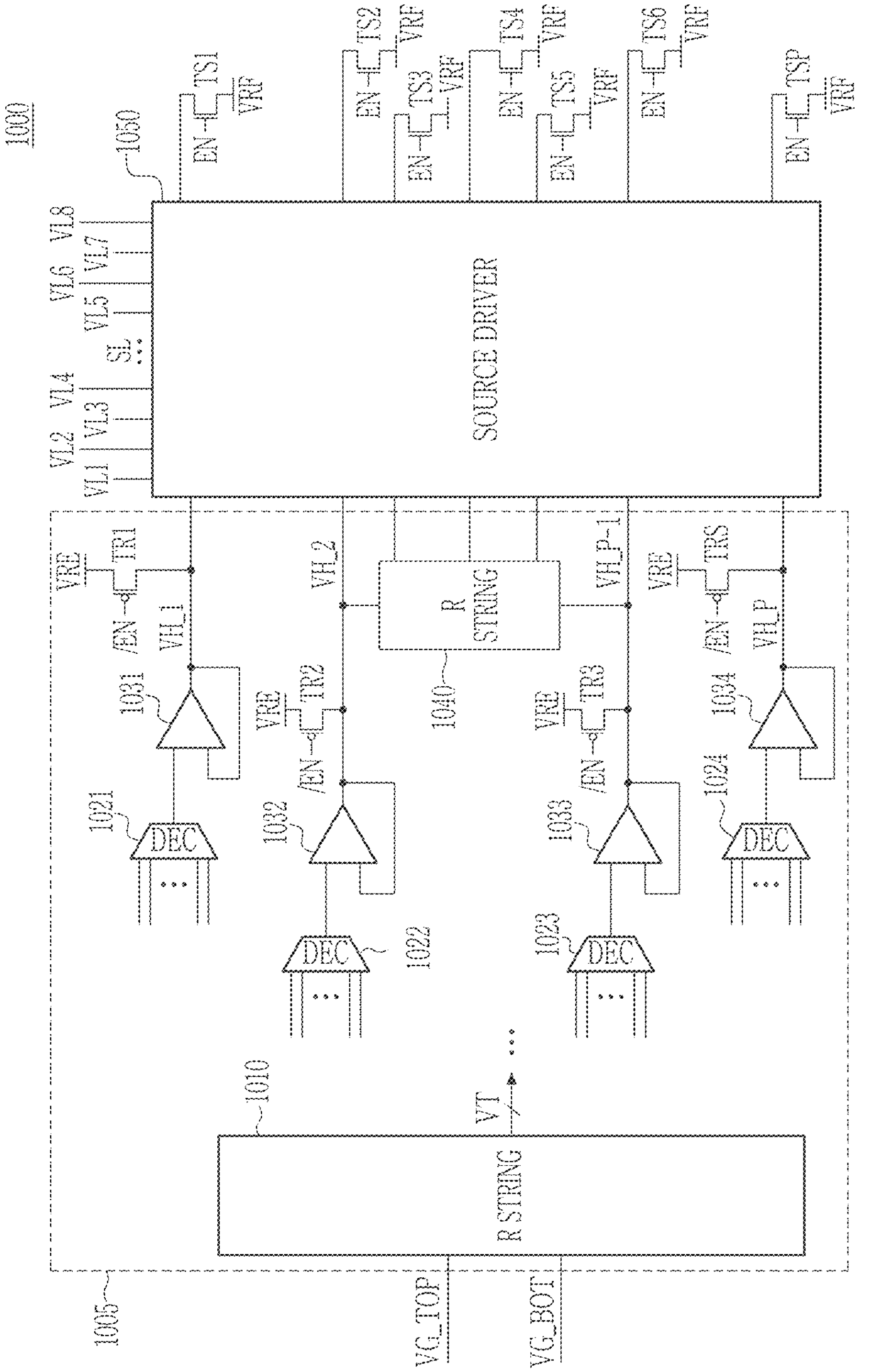
FIG. 13 shows a block diagram of an example of a display driving integrated circuit.

FIG. 13 shows a block diagram of an example of a display driving integrated circuit.

Referring to FIG. 13, the display driving integrated circuit 1000 may include a gamma voltage generator 1005, a source driver 1050, first transistors TR1 to TRS, and second transistors TS1 to TSP.

The gamma voltage generator 1005 may generate voltages VH_1 to VH_P based on the maximum gamma voltage VG_TOP and the minimum gamma voltage VG_BOT. The voltages VH_1 to VH_P generated by the gamma voltage generator 1005 may be input to the source driver 1050 as the gamma voltages. The gamma voltage generator 1005 may include a first resistor string 1010, decoders 1021 to 1024, amplifiers 1031 to 1034, and a second resistor string 1040. According to the implementation, the gamma voltage generator 1005 may further include at least one resistor string, at least one decoder, and at least one amplifier. The descriptions on the first resistor string 710, the decoders 721 to 724, the amplifiers 731 to 734, and the second resistor string 740 shown in FIG. 8 are identically applied to the first resistor string 1010, the decoders 1021 to 1024, the amplifiers 1031 to 1034, and the second resistor string 1040. Hence, no repeated description will be provided.

The source driver 1050 may generate data signals based on the voltages VH_1 to VH_P. The source driver 1050 may output the voltages VL1 to VL8 as data signals. The source driver 1050 may include decoders and source amplifiers connected to the decoders. For example, the description on the source driver 320 of FIG. 5 may be identically applied to the source driver 1050.

The first transistors TR1 to TRS and the second transistors TS1 to TSP may have different types of transistors. For example, the first transistors TR1 to TRS may be PMOS transistors, and the second transistors TS1 to TSP may be NMOS transistors.

The first transistors TR1 to TRS and the second transistors TS1 to TSP may be arranged at respective ends of the gamma line. For example, the first transistors TR1 to TRS may be arranged at the front end (e.g., the gamma line between the gamma voltage generator 1005 and the source driver 1050) of the gamma line, and the second transistors TS1 to TSP may be arranged at the rear end (e.g., the gamma line after the source driver 1050) of the gamma line.

The first transistors TR1 to TRS may be connected to the respective gamma lines through the drains. The first transistors TR1 to TRS may receive a first voltage VRE through the sources. The second transistors TS1 to TSP may be connected to the respective gamma lines through the drains. The second transistors TS1 to TSP may receive a second voltage VRF through the sources.

Two signals that are complementary to each other may be input to the gates of the first transistors TR1 to TRS and the gates of the second transistors TS1 to TSP. For example, the not-enable signal/EN may be input to the gates of the first transistors TR1 to TRS, and the enable signal EN may be input to the gates of the second transistors TS1 to TSP. Hence, the first transistors TR1 to TRS and the second transistors TS1 to TSP may be turned into the On-state and the current may flow.

The resistance components of the respective gamma lines for connecting the gamma voltage generator 1005 and the source driver 1050 may be different from each other. Different sizes of voltage drops may be generated by the currents flowing to the gamma lines and the different resistance components. That is, the source driver 1050 may receive abnormal voltage from among the voltages VH_1 to VH_P, and may generate an abnormal voltage from among the voltages VL1 to VL8 based on the abnormal voltage. The display driving integrated circuit 1000 may determine the gamma lines to be bad when one or more of the voltages VL1 to VL8 deviate from the reference voltage range. The display driving integrated circuit 1000 may determine the gamma lines to be normal when there is no one of the voltages VL1 to VL8 that deviates from the reference voltage range. The first transistors TR1 to TRS and the second transistors TS1 to TSP are turned into the On-state based on the first voltage VRE, the second voltage VRF, the not-enable signal/EN, and the enable signal EN so the gamma lines may be simultaneously tested, and the screening time may be reduced.

In some implementations, the display driving integrated circuit 1000 may not measure the voltages VL1 to VL8, and an external test device may be connected to the source driver 1050, may measure the voltages VL1 to VL8, and may determine whether the gamma lines are normal.

Figure 14:
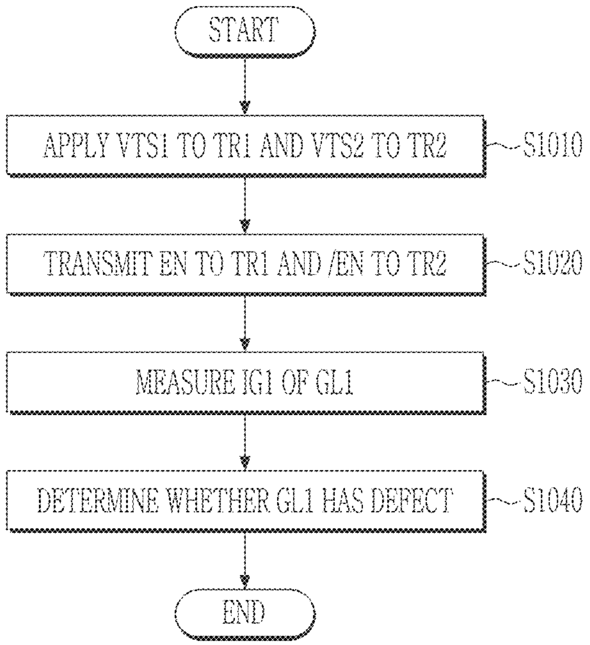
FIG. 14 shows a flowchart of an example of a method for testing a gamma line.

FIG. 14 shows a flowchart of an example of a method for testing a gamma line.

Referring to FIG. 14, the test device may determine whether the gamma lines of the DDI may have defects. The gamma lines may be connected to different types of two transistors. For example, the PMOS transistor may be connected to the front end of the gamma line, and the NMOS transistor may be connected to the rear end of the gamma line. The drains of the PMOS transistor and the NMOS transistor may be connected to the gamma line. The gamma line before it is connected to the source driver with respect to the source driver may be referred to as the front end, and the gamma line after it is connected thereto may be referred to as the rear end.

A configuration in which the test device determines whether the first gamma line GL1 from among the gamma lines has a defect will now be described. The description on the first gamma line GL1 may be identically applied to the other gamma lines that are not the first gamma line GL1 of the gamma lines. The test device may be combined to the controller in the DDI or may be arranged outside the DDI.

The test device may apply the first test voltage VTS1 to the first transistor TR1, and may apply the second test voltage VTS2 to the second transistor TR2 (S1010). The test device may apply a voltage to the sources of the first and second transistors TR1 and TR2. In some implementations, the first test voltage VTS1 may be the maximum gamma voltage (e.g., VG_TOP in FIG. 2) input to the gamma voltage generator. In some implementations, the second test voltage VTS2 may be a ground voltage. In some implementations, the test device may control a power source to apply the first and second test voltages VTS1 and VTS2 to the first and second transistors TR1 and TR2.

The test device may transmit the not-enable signal/EN to the first transistor TR1, and may transmit the enable signal EN to the second transistor TR2 (S1020). The not-enable signal/EN may be an inverted signal of the enable signal EN. The test device may transmit signals to the gates of the first and second transistors TR1 and TR2. The first transistor TR1 may be turned to the On-state based on the second level (e.g., low) of the not-enable signal/EN. The second transistor TR2 may be turned to the On-state based on the first level (e.g., high) of the enable signal EN. That is, the first and second transistors TR1 and TR2 may be simultaneously turned to the On-state. When the first and second transistors TR1 and TR2 are in the On-state, the current IG1 may flow to the first gamma line GL1 based on the resistance component of the first gamma line GL1 and the potential difference of the first and second test voltages VTS1 and VTS2.

The test device may measure the current IG1 of the first gamma line GL1 (S1030).

The test device may determine whether the first gamma line GL1 has a defect (S1040). The test device may determine whether the first gamma line GL1 has a defect based on the current value of the current IG1 and the reference current range. For example, the test device may determine the first gamma line GL1 to be normal when the current value is within the reference current range, and it may determine the first gamma line GL1 to be abnormal when the current value deviates from the reference current range.

In some implementations, the test device may calculate the resistance of the first gamma line GL1 based on the current value of the current IG1. For example, the test device may calculate the resistance of the first gamma line GL1 based on the potential difference of the first and second test voltages VTS1 and VTS2 and the current value of the current IG1. The test device may determine whether the first gamma line GL1 has a defect based on the calculated resistance and the reference resistance range.

Figure 15:
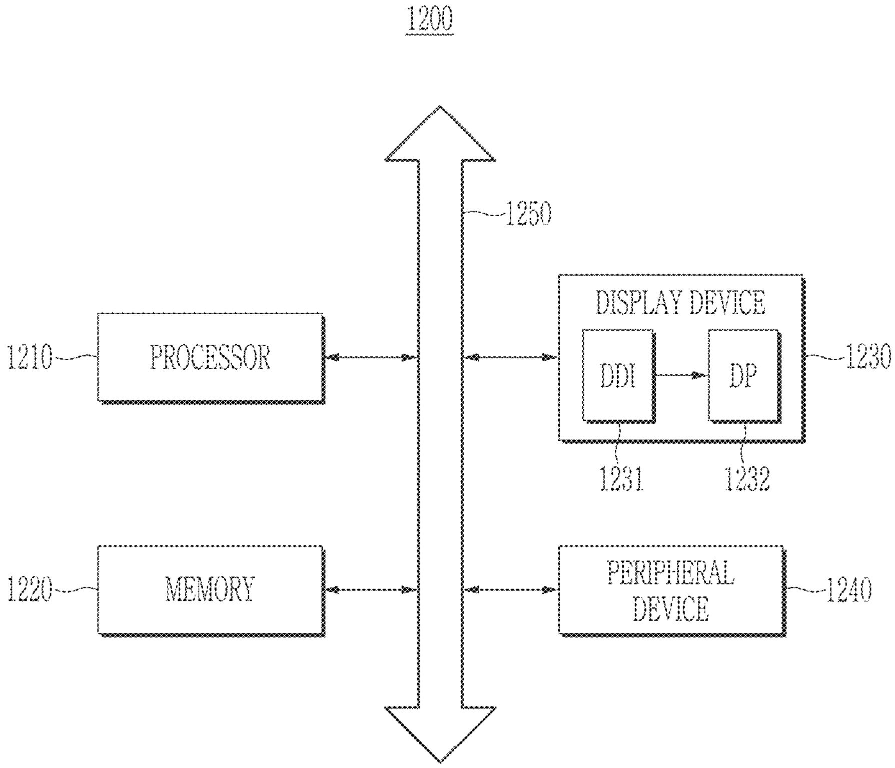
FIG. 15 shows an example of a semiconductor system.

FIG. 15 shows an example of a semiconductor system.

Referring to FIG. 15, the semiconductor system 1200 may include a processor 1210, a memory 1220, a display device 1230, and a peripheral device 1240 that are electrically connected to a system bus 1250.

The processor 1210 may control data inputs/outputs of the memory 1220, the display device 1230, and the peripheral device 1240, and may perform an image processing on the image data transmitted among the corresponding devices.

The display device 1230 includes a display driver IC (DDI) 1231 and a display panel (DP) 1232, and it may store the image data applied through the system bus 1250 into the frame memory included in the DDI 1231 and may display the same on the display panel 1232. The DDI described with reference to FIG. 1 to FIG. 14 may be combined to the DDI 1231. That is, the DDI 1231 may determine the currents or resistance of the gamma lines connected to the source driver. The DDI 1231 may determine the currents or resistance by using two transistors connected to the respective gamma lines. The DDI 1231 may determine whether the gamma lines have defects based on the determined current or resistance. When the DDI 1231 include a gamma line having a defect, it is screened so the DDI 1231 having no defects may be used in displaying images, and the display device 1230 may display high-quality images.

The peripheral device 1240 may convert videos or still images made by a camera, a scanner, or a webcam into electrical signals. The image data obtained by the peripheral device 1240 may be stored in the memory 1220 or may be displayed in real-time on the display panel 1232.

The memory 1220 may include a volatile memory such as a dynamic random access memory (DRAM) and/or a non-volatile memory such as a flash memory. The memory 1220 may be configured with a DRAM, a phase-change random access memory (PRAM), a magnetic random access memory (MRAM), a resistive random access memory (ReRAM), a ferroelectric random access memory (FRAM), a NOR flash memory, a NAND flash memory, and a fusion flash memory (e.g., a memory in which a static random access memory (SRAM) buffer, a NAND flash memory, and a NOR interface logic are combined). The memory 1220 may store the image data obtained from the peripheral device 1240 or video signals processed by the processor 1210.

The semiconductor system 1200 may be installed mobile electronic products such as smartphones, and without being limited thereto, it may be installed in various types of electronic products for displaying images.

In some implementations, the respective constituent elements described with reference to FIG. 1 to FIG. 15 or combinations of two or more of the constituent elements may be realized with digital circuits, programmable or non-programmable logic devices or arrays, or application specific integrated circuits (ASIC).

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a combination can in some cases be excised from the combination, and the combination may be directed to a subcombination or variation of a subcombination.

While the present disclosure has been described in connection with exemplary implementations, it is to be understood that the present disclosure is not limited to the disclosed implementations, but on the contrary, is intended to cover various modifications and equivalent arrangements included within the spirit and scope of the appended claims.

What is claimed is:

1. A display driving integrated circuit comprising:

a gamma voltage generator configured to generate a plurality of gamma voltages;

a source driver configured to generate a plurality of data signals based on the plurality of gamma voltages;

a plurality of gamma lines connecting the gamma voltage generator with the source driver, the plurality of gamma lines configured to transmit the plurality of gamma voltages;

a first transistor connected with a first end of a first gamma line of the plurality of gamma lines, the first transistor including a first gate that is configured to receive a first signals; and a second transistor connected with a second end of the first gamma line, the second transistor including a second gate that is configured to receive a second signal, the first signal and the second signal being complementary to each other, wherein the first end and the second end of the first gamma line include a front end between the gamma voltage generator and the source driver and a rear end after the source driver.

2. The display driving integrated circuit of claim 1, wherein the first transistor is connected with the front end, and the second transistor is connected with the rear end.

3. The display driving integrated circuit of claim 1, wherein the first transistor and the second transistor are different types of transistors.

4. The display driving integrated circuit of claim 3, wherein a drain of the first transistor and a drain of the second transistor are connected with the first gamma line.

5. The display driving integrated circuit of claim 1, further comprising a controller configured to apply an enable signal to the second transistor and to apply a not-enable signal to the first transistor, the not-enable signal being an inverted signal of the enable signal.

6. The display driving integrated circuit of claim 1, wherein the first transistor is configured to receive a first test voltage, and the second transistor is configured to receive a second test voltage through a source, and a first current is configured to flow to the first gamma line by the first test voltage, the second test voltage, and a resistance component between the first end and the second end of the first gamma line.

7. The display driving integrated circuit of claim 6, further comprising a controller configured to determine that the first gamma line has a defect based on a current value of the first current.

8. The display driving integrated circuit of claim 7, wherein the controller is configured to determine the first gamma line to be abnormal based on the first current being outside a reference current range.

9. The display driving integrated circuit of claim 7, wherein the controller is configured to determine resistance of the resistance component based on the current value of the first current, and to determine that the first gamma line has a defect based on the resistance.

10. The display driving integrated circuit of claim 9, wherein the controller is configured to determine the first gamma line to be abnormal based on the resistance being outside a reference resistance range.

11. The display driving integrated circuit of claim 6, wherein the gamma voltage generator is configured to receive a maximum gamma voltage and a minimum gamma voltage, and to generate the plurality of gamma voltages based on the maximum gamma voltage and the minimum gamma voltage, and the first transistor is configured to receive the maximum gamma voltage as the first test voltage.

12. The display driving integrated circuit of claim 1, wherein the source driver includes:

a plurality of decoders configured to select a gamma voltage of the plurality of gamma voltages, and a plurality of source amplifiers connected with the plurality of decoders, the plurality of source amplifiers configured to amplify the selected gamma voltage and to output the amplified gamma voltage to a display panel, and wherein the plurality of gamma lines is connected with the plurality of decoders.

13. A display driving integrated circuit comprising:

a source driver configured to generate a plurality of data signals based on a plurality of gamma voltages, the plurality of gamma voltages being generated by a gamma voltage generator;

a plurality of gamma lines configured to transmit the plurality of gamma voltages to the source driver;

a plurality of first transistors positioned at a first end of the plurality of gamma lines; and a plurality of second transistors having different types from the plurality of first transistors, the plurality of second transistors positioned at a second end of the plurality of gamma lines, wherein the first end and the second end of the plurality of gamma lines include a front end between the gamma voltage generator and the source driver and a rear end after the source driver.

14. The display driving integrated circuit of claim 13, wherein the plurality of first transistors includes a plurality of p-channel metal oxide semiconductor (PMOS) transistors, and the plurality of second transistors includes a plurality of n-channel metal oxide semiconductor (NMOS) transistors.

15. The display driving integrated circuit of claim 13, further comprising a controller configured to:

output an enable signal to a plurality of gates of the plurality of second transistors, output a not-enable signal to a plurality of gates of the plurality of first transistors, the not-enable signal being an inverted signal of the enable signal, and determine that the plurality of gamma lines have defects based on a plurality of current values of the plurality of gamma lines.

16. The display driving integrated circuit of claim 15, wherein the controller is configured to generate a plurality of enable signals that have a same pulse width and have a plurality of first levels that do not overlap each other in a time region, and to output the plurality of enable signals to the plurality of gates of the plurality of second transistors.

17. The display driving integrated circuit of claim 16, wherein the controller is configured to output a plurality of different enable signals to the plurality of second transistors, respectively, and to determine that the plurality of gamma lines have defects based on the plurality of current values of the plurality of gamma lines.

18. The display driving integrated circuit of claim 16, wherein the controller is configured to output a same enable signal to at least two second transistors of the plurality of second transistors, and to determine that at least two gamma lines of the plurality of gamma lines have defects based on at least two current values of the at least two gamma lines, the at least two gamma lines of the plurality of gamma lines corresponding to the at least two second transistors.

19. A method for testing defects of a gamma line sequentially connected to a first transistor, a source driver, and a second transistor comprising:

applying a first test voltage to the first transistor, the first transistor being connected with a first end of the gamma line;

applying a second test voltage to the second transistor, the second transistor being connected with a second end of the gamma line, and the first end and the second end of the gamma line including a front end between a gamma voltage generator and the source driver and a rear end after the source driver;

transmitting an enable signal to a gate of the second transistor;

transmitting a not-enable signal to a gate of the first transistor, the not-enable signal being an inverted signal of the enable signal;

obtaining a current value of a current flowing to the gamma line; and determining that the gamma line has a defect based on the current value.

20. The method of claim 19, wherein determining that the gamma line has a defect includes:

determining the gamma line to be abnormal based on the current value being outside a reference current range.

* * * * *